July 7, 1970    G. VOIGTLAENDER-TETZNER    3,519,831
CONTACT-FREE MEASURING DEVICE FOR WIRE AND
SIMILARLY SHAPED MATERIAL
Filed June 26, 1967    3 Sheets-Sheet 1
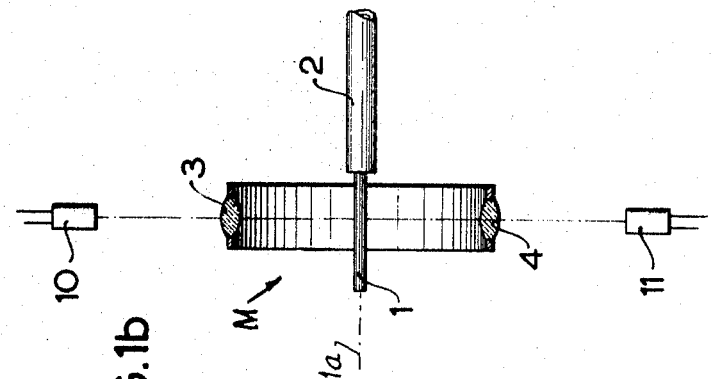
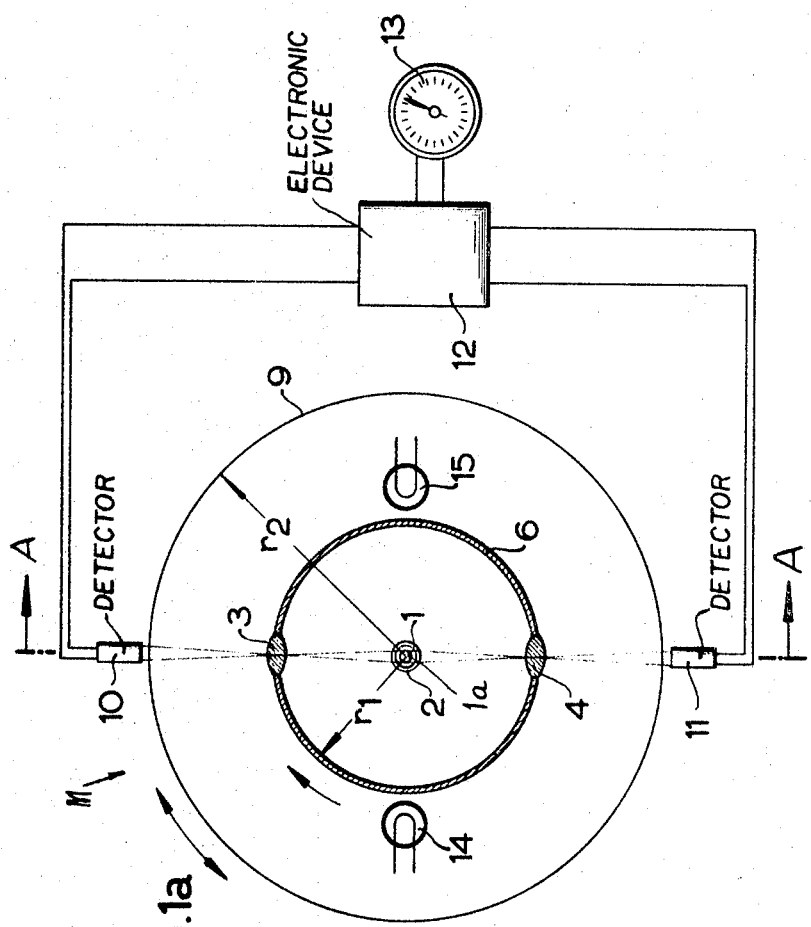
INVENTOR
GERHARD VOIGTLAENDER-TETZNER
BY
*McGlew & Toren*
ATTORNEYS

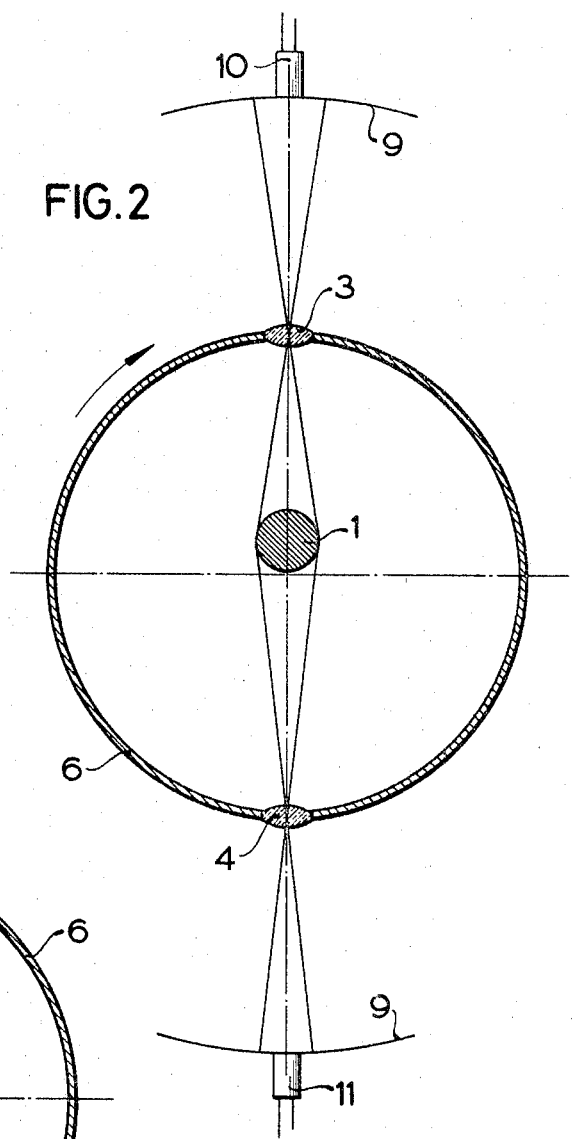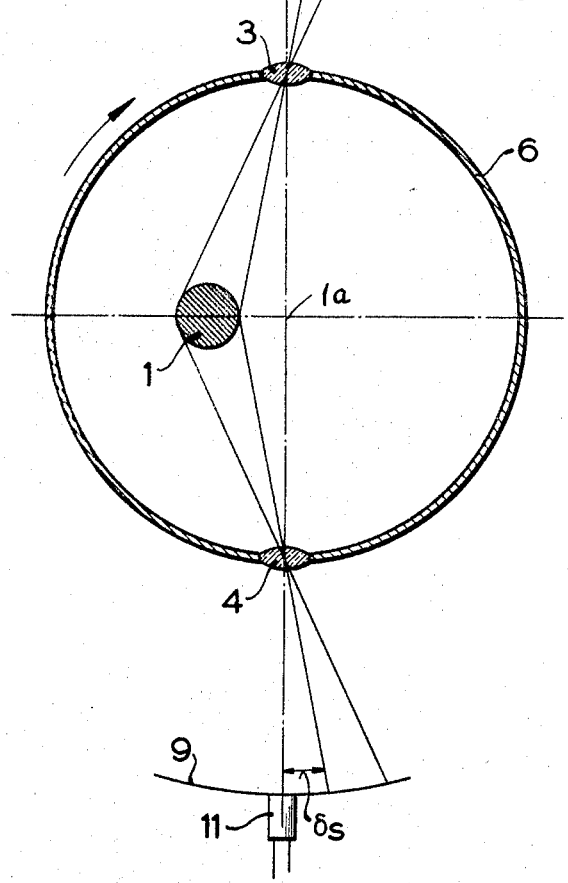

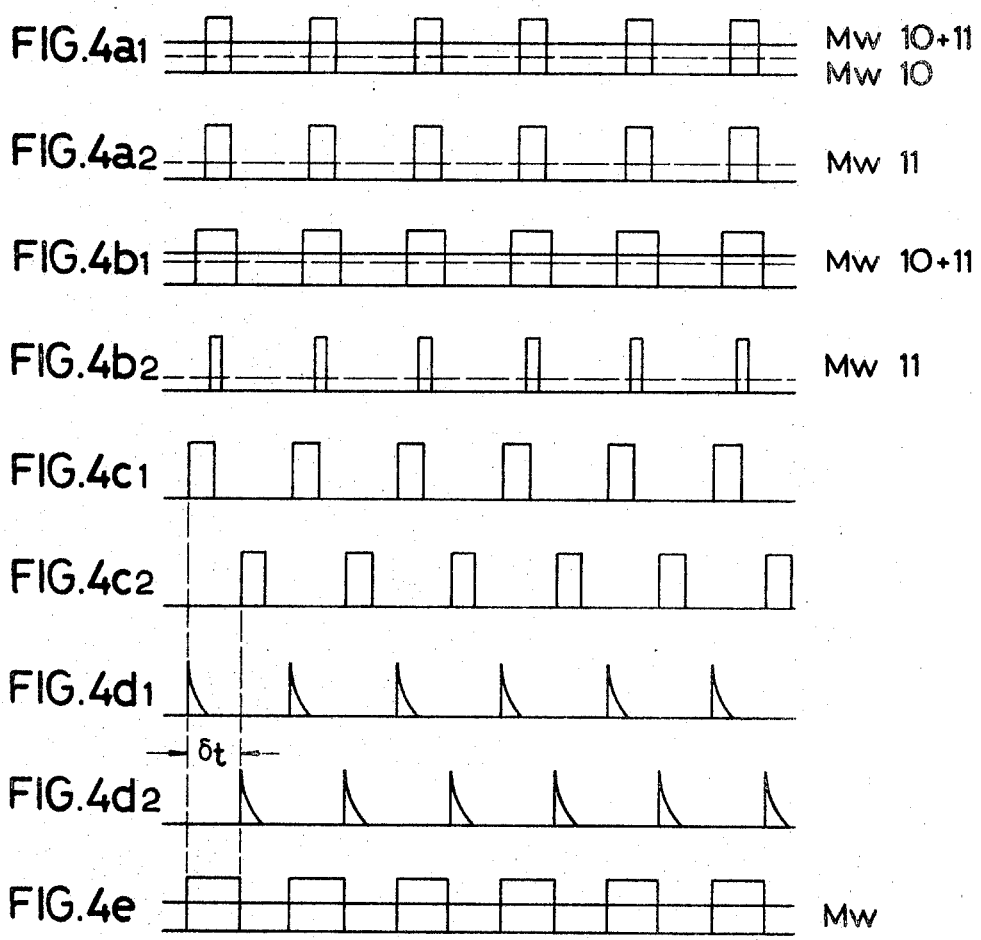

3,519,831
CONTACT-FREE MEASURING DEVICE FOR WIRE
AND SIMILARLY SHAPED MATERIAL
Gerhard Voigtlaender-Tetzner, Leverkusen, Germany, assignor to Exatest Messtechnik Gesellschaft mit beschrankter Haftung Friedrichstr, Leverkusen, Germany
Filed June 26, 1967, Ser. No. 648,689
Claims priority, application Germany, June 29, 1966,
E 31,948
Int. Cl. G01b 11/10
U.S. Cl. 250—219
10 Claims

ABSTRACT OF THE DISCLOSURE

Apparatus for contact-free measurement of the transverse sectional dimensions of material having a wire, band or similarly shaped configuration wherein the material passes continuously along an axis of travel and a pair of lenses are diametrically mounted on a first ring arranged perpendicularly to the axis of travel. Concentrically arranged about the axis and the first ring and in the same plane with the first ring is a second ring on which are mounted a pair of diametrically opposed light sensitive detectors. The image of the material to be measured passes through the lenses and is reproduced on the detectors which, in turn, send a signal to a measuring device which displays the dimension of the material on an indicating instrument. The rings may be arranged to rotate in the same or different directions and multiple pairs of lenses and detectors may be mounted in uniformly spaced relationship on the respective rings. In the event the material does not provide its own illumination, means may be provided for illuminating the material.

SUMMARY OF THE INVENTION

The present invention is directed to a contact-free measuring device and, more particularly, to a device employing lenses for reproducing an image of the material to be measured on a detector which, in turn, emits a signal to a device for indicating the dimension of the material. This invention is concerned with a device for measuring the transverse section of wire, band or similarly shaped material, particularly rolled material, which is passed continuously along an axis of travel.

In the past, various methods have been employed for taking measurements of the type to which the present invention is directed. One of these methods reproduces a shadow of the material to be measured, for example, reproducing the shadow of a wire by means of a lens. In this method, light rays are directed through a lens to a light sensitive detector and periodically the rays are interrupted by a revolving mirror which reflects the shadow of the wire into the detector. As long as the mirror reflects light into the detector, the detector emits an electrical signal which is discontinued when it receives the reflection of the wire. Accordingly, an electrical impulse is formed whose width is proportional to the diameter of the wire. Naturally, instead of reflecting the shadow of the wire into the light source, it would be possible to reflect the light of a glowing wire to achieve the same measuring effect.

In another method instead of a revolving mirror a reciprocating wobble mirror is used.

A third method projects the luminous image of the wire or its shadow onto a ruler which is formed by the ends of parallel horizontally arranged light conductors. The opposite ends of the light conductors are situated on the circumference of a circle which is arranged opposite a revolving disk. On the circumference of the revolving disk is the end of another light conductor which is passed by the oppositely arranged light conductors and receives light from the illuminated light conductors transmitting it to a detector positioned in the center of the revolving disk.

These methods have the disadvantage that the measured value varies with the distance between the wire and the lens of the measuring instrument because the wire is observed under a certain angle which increases or decreases as the distance between the wire and the lens varies. Further, an object distance is determined by the focal length of the lens and the image distance may vary only within a limited range as determined by the admissible measuring error of the equipment employed.

Each of the above-mentioned prior art methods has the additional disadvatnage that the diameter of the wire or of the material being measured can only be determined with an instrument arranged in one direction. If it is desired to check the diameter at right angles to the one being determined by the measuring instrument, either two instruments must be used disposed perpendicularly to one another or the measuring instrument must be turned 90°. Where a problem of time is involved in taking the measurements, it is preferable to use two instruments. In measuring the diameter of wire during its rolling operation, as is known, the measurement of at least three diameters is required, the positions of which may vary. In addition, the wire may roll about its axis during the measuring operation. For this reason, it is preferable if all of the diameters around the circumference of the wire can be measured at one time so that it can be determined whether the wire is too large or too small without regard to any specific diameter.

To overcome the above disadvantages and to permit the complete measurement of all the diameters of a wire about its circumference, the present invention employs a pair of lenses positioned on a circular ring which is arranged concentrically of the axis of travel of a material to be measured. The ring is rotatable about the axis. The lenses are diametrically opposed to each other across the ring, and if several pairs of lenses are used, they are disposed in diametrically opposed pairs and are equally spaced from one another about the ring.

In addition, a second circular ring is disposed concentrically about the axis of travel of the material and about the first circular ring, and is positioned in the same plane as the first ring. The second ring also rotates in either the same or the opposite direction to the first ring. Alternatively, the second ring may be arranged to rotate or to swing in both directions. In the event the material to be measured is not luminous, that is, it does not provide its own source of light rays to be passed through the lens to the detector, lamps may be used to illuminate the material to be measured. These lamps may be arranged on the first ring which supports the lenses.

Accordingly, it is a primary object of the present invention to provide apparatus for contact-free measuring of a multiple number of exterior transverse dimensions of wire or similarly shaped material passing through a measuring station.

It is another object of the invention to afford a measuring apparatus comprising one or a multiple number of pairs of diametrically opposed lenses mounted on a rotating ring for reproducing an image of the material to be measured in a pair of detectors.

Still another object of the invention is to provide apparatus which overcomes the various disadvantages experienced in the prior art and provides an arrangement for continuously recording multiple dimensions of a moving strip of material.

Therefore, the preent invention provides a device for the contact-free measurement of the transverse sectional dimensions of material having a wire, band or similarly shaped configuration in which the material to be measured is passed continuously along an axis of travel and a pair of diametrically opposed lenses are positioned on a rotatable ring arranged concentrically about and normally to the axis of travel whereby a plurality of dimensions can be reproduced by passing light through the lenses to a pair of diametrically opposed detectors mounted on a similarly concentrically arranged circle positioned outwardly from the ring containing the lenses.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE PREFERRED EMBODIMENT

In the drawings:

FIG. 1a is a schematic illustration of apparatus embodying the present invention;

FIG. 1b is a view taken along line A—A in FIG. 1a;

FIG. 2 is an enlarged view of a portion of the apparatus illustrated in FIG 1a with the material to be measured displaced from the axis of travel;

FIG. 3 is another enlarged view of the apparatus shown in FIG. 1a with the material to be measured displaced in a different direction from that displayed in FIG. 2.

FIGS. 4a1 and 4a2 are graphic illustrations of measurements made with the apparatus shown in the above figures in which the material being measured is disposed concentrically on the axis of travel;

FIGS. 4b1 and 4b2 are graphic illustrations similar to those in FIGS 4a1 and 4a2 where the material is displaced vertically from the axis of travel as shown in FIG. 2;

FIGS. 4c1 and 4c2 are graphic illustrations similar to those in FIGS. 4a1 and 4a2 where the material is displaced horizontally from the axis of travel as shown in FIG. 3;

FIGS. 4d1 and 4d2 exhibit the pulse needles resulting from the differentiation of the forward portions of the pulses set forth in FIGS. 4c1 and 4c2; and FIG. 4e exhibits a new pulse sequence obtained by opening and closing a gate by means of the pulse needles shown in FIGS. 4d1 and 4d2.

DETAILED DESCRIPTION

In FIGS. 1a and 1b a glowing wire 1, that is, one which supplies its own illumination is shown passing continuously through a measuring station M along an axis of travel 1a. The wire 1 extends through a guide tube 2, see FIG. 1b, on one side of the measuring station, and after its measurements transverse to the axis have been taken, it passes into a similar tube located on the opposite side (not shown). A pair of diametrically opposed lenses 3, 4 are arranged on a circular ring 6 disposed concentrically about the axis of travel 1a. Each of the lenses is disposed a distance, R1, from the theoretical axis of the wire being measured, the actual axis of the wire may be displaced from the theoretical axis. The lenses 3 and 4 reproduce the image of the wire in opposite directions onto light sensitive detectors 10 and 11 positioned on the outer edge of a circle 9.

The detectors 10 and 11 are also diametrically opposed to one another and are positioned equidistant from the theoretical axis of the wire, that is, a distance R2, as shown in FIG. 1a. The detectors 10 and 11 are connected electrically and emit signals to an electronic device 12 which may comprise the integrating, gating and counting circuits noted below. In turn, a measuring instrument 13 is connected to the device 12 for displaying the measurements of the material passing through the measuring station.

The ring 6 is arranged to rotate about the axis of travel 1a of the wire 1, as indicated by the arrow disposed adjacent its circumference. As the ring rotates, two sharp images of the wire travel constantly along the circle 9. As the images pass over the detectors 10 and 11, the detectors are exposed to the light rays which form the image and emit, for the duration of their exposure, electrical signals which pass to the electronic device 12 which, in turn, processes the signals and indicates the dimension measured in the instrument 13.

If the wire or other material to be measured is arranged exactly centrally on the axis of travel 1a as it passes through measuring station M, the duration of the two signals emitted by the detectors will be equal. This is graphically displayed in FIGS. 4a1 and 4a2, in which, in the ideal case, the signals from each of the detectors 10 and 11, form a rectangular pulse. However, if the material to be measured is displaced from the axis of travel, that is, if it is closer to one of the lenses than to the other, see FIG. 2, the image received on the detectors will be of a different size and, in turn, the signal emitted to the device 12 will be of a different duration. This is illustrated in FIGS. 4b1, 4b2, wherein the image received in FIG. 2 on the detector 10 is larger than that received on detector 11, providing a difference in the signals sent to the device 12. However, the mean value of the two signals is equal to that shown in FIG. 1 where the material is concentrically positioned on the theoretical axis of travel. If the pulses received from the detectors 10 and 11 are integrated in the manner shown in FIGS. 4a1 and 4b1, D.C. voltage signals of equal length are obtained in each case.

If the wire is displaced laterally from the theoretical axis, the reproductions of the material being measured passing through the lenses 3 and 4 and received in the detectors 10 and 11 on the circle 9, will be displaced in opposite directions, as shown in FIG. 3. One signal will arrive earlier than the other in its respective detector see FIGS. 4c1 and 4c2. In this manner, the front flank or forward portion of the pulse can be differentiated as shown in FIGS. 4d1, 4d2, with the time interval $\delta t$ between the two resulting pulse needles being proportional to the displacement $2\delta s$ of the image on the circle 9, see FIG. 3:

$$\delta t \sim 2\delta s$$

If a gate is opened with the first pulse inicated in FIG. 4d1 and is closed by the second pulse as indicated in FIG. 4d2, a new pulse sequence, as shown in FIG. 4e, is obtained whose mean value affords a D.C. voltage signal whose duration is proportional directly to the $\delta t$ and can then be used as a correction. In this way, it is possible to take into account automatically all the dimensional variations of the wire either by the integration of the signals or by the correction signals in the manner described above.

The same result can be accomplished when the individual pulses are evaluated by calculating mean values with a digital evaluation instead of the analog device mentioned above, and providing them with a correction for lateral displacement. This is accomplished by setting one counter in operation for the duration of a signal of each of the detectors 10 and 11 and adding up their results. If the counter operates with the frequency $f$ in the time $t$ of the duration of a pulse so that $$f \times t = d/2$$

whereby the sum of the two countings is equal to the dimension of the wire diameter. In a similar manner, the time differences $\delta t$ of the pulse needles shown in FIGS. 4d1, 4d2 can be transformed according to FIG. 4e into high frequency pulses so that a correcting signal is obtained.

If the detectors 10 and 11 are mounted on a rotatable ring which coincides with the circle 9, any diameter of wire can be measured by rotating this ring. But the ring 9 must turn at a rate slower than the ring 6 or lead in steps so that it interrupts the device 12 during the rotation. It is immaterial whether the ring 9 rotates forwardly or rearwardly with reference to the circle 6. Further, it is possible for it to rotate or reciprocate back and forth so that variable measuring lines can be obtained. In addition to the above arrangement where a pair of detectors are diametrically opposed on the ring, any number of pairs of detectors can be disposed on the circle separated at a predetermined angle. If a sufficient number of pairs of detectors are employed, the rotary movement of the ring can be eliminated. After the signals are evaluated in the device 12, the calculated measurement is displayed by the indicating instrument 13.

The measuring capability of the arrangement set forth in FIG. 1 can be increased by adding a number of pairs of lenses to the ring 6 to achieve a higher measuring frequency. The lenses, as shown in FIG. 1, will be located in oppositely disposed pairs with the distance between adjacent lenses being equal about the ring.

In the apparatus of the present invention, it is possible to provide measurements of the material passing along the axis of travel though the material may turn about its axis. The only prerequisite is that the direction of rotation of the wire and of the ring 9 with the detectors is the same though their speeds of rotation are different. Even if they differ only slightly, the wire can be measured completely in one revolution, particularly when the rotary movement of the ring about the wire is provided in a reciprocating half cycle.

In the above description, the material being measured was represented as glowing and therefore gave off sufficient light to provide a reproduction of its image through the lenses into the detectors. However, it is possible in the present invention to measure the dimensions of material which does not glow or provide its own source of light by utilizing lamps 14 and 15 mounted on the ring 6 for illuminating the material. As shown in FIG. 1a, two lamps 14 and 15 are mounted on the ring 6 in diametrically opposed relationship so that the line connecting the lamps is situated perpendicularly to the axis running through lenses 3 and 4. It will be appreciated that if the number of lenses is increased, it will also be possible to increase the number of lamps. In this arrangement with the lamps disposed perpendicularly to the axis of the lenses, the material being measured is completely illuminated. The lamps must have sufficient luminous power to properly modulate the detectors by light rays reflected through the lenses.

While a specific embodiment of the invention has been shown and described in detail to illustrate the application of the inventive principles, it will be understood that the invention may be embodied otherwise without departing from such principles.

What is claimed is:

1. A device for the contact-free measurement of the transverse sectional dimensions of materials having a wire, band or similarly shaped configuration, wherein the material to be measured passes continuously along an axis of travel, and comprises a pair of lenses positioned in a plane arranged perpendicularly to the axis of travel, said lenses equidistantly spaced from the axis of travel and being disposed in diametrically opposed relationship on opposite sides of the axis of travel, a pair of light sensitive detectors adapted to emit an electrical signal and being disposed in the same perpendicular plane to the axis of travel as said pair of lenses and being spaced equidistantly from the axis of travel at a greater distance than the spacing of said lenses from the axis of travel, said detectors being disposed in diametrically opposed relationship on opposite sides of the axis of travel, means for aligning said lenses and detectors on the same diametrical line through the axis of travel so that on each of the opposite sides of the axis of travel simultaneous measurements of the same dimension on the material are measured by said lenses and said detectors by means of the light rays transmitted by the material through each said lens to each of one of said detector, and means for receiving electrical signals from said detectors for indicating the dimensions of the material so that by means of the measurements made on the diametrically opposed sides of the material the dimension of the material can be accurately measured irrespective of any displacement of the material from the axis of travel.

2. A device as set forth in claim 1, wherein said lenses are mounted on a first ring arranged to rotate about and disposed concentrically about said axis of travel.

3. A device as set forth in claim 2, wherein said detectors are mounted on a second ring arranged to rotate about and disposed concentrically about said axis of travel and said first ring.

4. A device as set forth in claim 3, wherein said means for receiving electrical signals comprises a device for processing the signals received from said detectors, and an indicating instrument for displaying the measurements of the materials.

5. A device for the contact-free measurement of the transverse sectional dimensions of materials having a wire, band or similarly shaped configuration, wherein the material to be measured passes continuously along an axis of travel, and comprises a pair of lenses positioned in a plane arranged perpendicularly to the axis of travel, said lenses equidistantly spaced from the axis of travel and disposed in diametrically opposed relationship on opposite sides of the axis of travel, a pair of light sensitive detectors adapted to emit an electrical signal disposed in the same perpendicular plane to the axis of travel as said pair of lenses and equidistantly spaced from the axis of travel outwardly from said lenses, said detectors disposed in diametrically opposed relationship on opposite sides of the axis of travel, a first ring positioned concentrically about the axis of travel and mounted for rotation in a plane disposed perpendicularly to the axis of travel, said lenses being mounted on said first ring, a second ring positioned concentrically about the axis of travel and said first ring and mounted for rotation in a plane disposed perpendicularly to the axis of travel, said detectors being mounted on said second ring, and means for rotating said second ring in the same direction as and in the opposite direction to said first ring so that at least at spaced intervals during rotation the diametrical line through said detectors coincides with the diametrical line through said lenses, and means for receiving electrical signals from said detectors for indicating the dimensions of the material.

6. A device as set forth in claim 5, wherein a multiple number of said pairs of lenses are mounted on said first ring, said lenses equally spaced about said ring.

7. A device as set forth in claim 6, wherein a multiple number of said pairs of detectors are mounted on said second ring, said detectors equally spaced about said ring.

8. A device as set forth in claim 6, wherein means are provided for illuminating the material to be measured.

9. A device as set forth in claim 8, wherein lamps are mounted on said first ring in diametrically opposed relationship for illuminating the material to be measured.

10. A device as set forth in claim 9, comprising means for guiding the material to be measured along the axis of travel.

References Cited

UNITED STATES PATENTS

| | | | |
|---|---|---|---|
| 2,413,486 | 12/1946 | Denyssen | 250—219 X |
| 2,414,566 | 1/1947 | Thomas | 250—236 X |
| 2,895,373 | 7/1959 | Eyraud | 250—219 X |
| 3,153,723 | 10/1964 | Weiss | 250—83.3 |

WALTER STOLWEIN, Primary Examnier

U.S. Cl. X.R.

356—160